C. S. LOCKWOOD.
TWO-PART ROLL FOR ROLLER BEARINGS.
APPLICATION FILED JAN. 29, 1913.
1,104,364. Patented July 21, 1914.
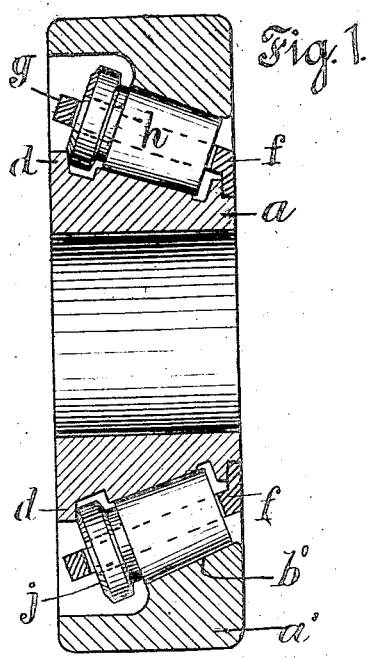
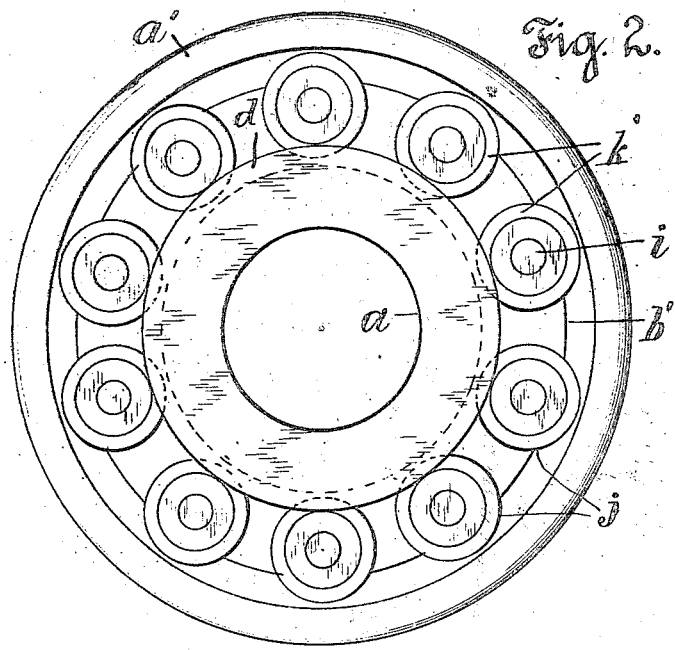
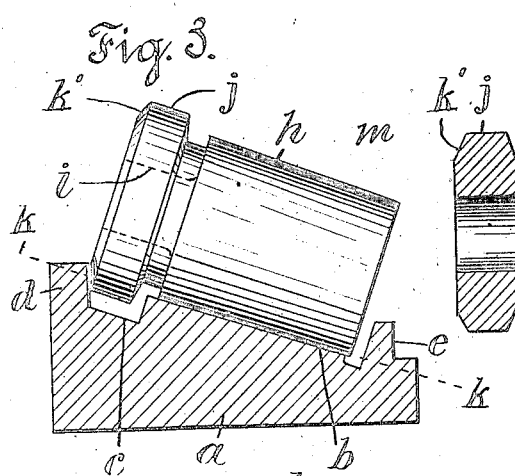
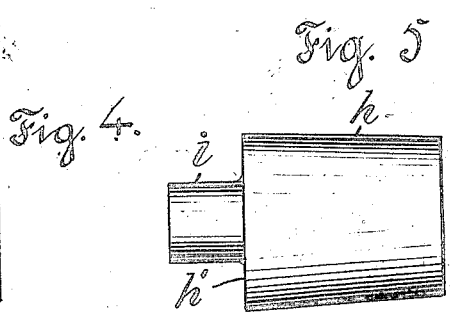
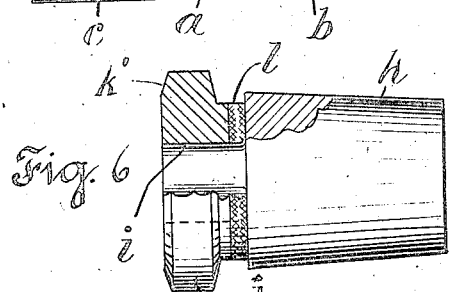
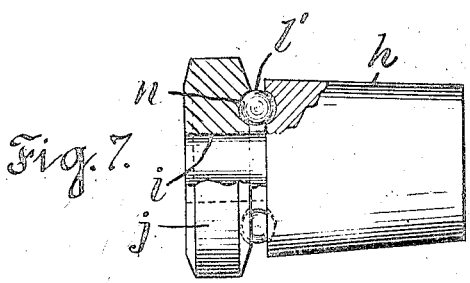
Witnesses
L. Lee.
J. Walter Greenbaum.
Inventor
Charles S. Lockwood
per Thomas L. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

TWO-PART ROLL FOR ROLLER-BEARINGS.

1,104,364.     Specification of Letters Patent.     Patented July 21, 1914.

Application filed January 29, 1913. Serial No. 744,879.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Two-Part Rolls for Roller-Bearings, fully described and represented in the following specification and the accompanying drawings, forming a part of the same.

The present invention relates to a roller-bearing operating with tapering rolls, which are often used instead of cylindrical rolls, because they are adapted to resist a considerable degree of longitudinal thrust. In such bearings, the hub and casing are provided with tapering seats to embrace the conical sides of the tapering rolls, and the tapering shape of the rolls tends when the load is placed upon the bearing to force them toward the larger end of the conical seat on the hub.

To resist such tendency without generating needless friction is the object of the present invention, and this I effect by forming an annular flange upon the larger end of the hub against which a collar upon the larger end of each roll may bear, and journaling the collars upon the rolls so that they may turn independently of the rolls, and thus avoid any rubbing friction, and tendency to displace the rolls, which would arise if contact with the hub and flange should rotate them at different speeds.

Any variation in the rotary motion of the roll-body, and its collar which resists end thrust, tends to advance or retard the larger end of the roll and thus to twist it from its normal position upon the hub, and produce a frictional contact where the roll touches the hub and where it is in contact with the guide which is commonly employed to hold the rolls in position. Such twisting produces heat and the destruction of lubricants, and also causes needless friction which diminishes the efficiency of the bearing.

It is desirable that the collar shall have a substantial bearing upon the flange which meets its thrust, so as to resist the tendency to wear; but the liability to rotate the collar at a speed different from the body of the roll is unavoidably produced if the surface of the collar has any material bearing-surface in contact with the flange, as the different parts of such surface would vary in their distance from the center of the hub, and thus tend to impart different speeds to different portions of the collar, which would thus be twisted upon the hub, and great friction result.

Where the collar upon the end of the roll is externally of the same diameter as the larger end of the roll, its surface which bears upon the flange would most of it necessarily be of less diameter than the roll and would tend to be driven at a higher speed than the roll by its contact with the flange. If the collar be made larger than the end of the roll, and the hub grooved to clear the periphery of such collar, the bearing-surface of the collar may be shaped to contact with the flange partly inside and partly outside the line of the conical hub upon which the body of the rolls rotate, and a substantial bearing-surface thus be obtained. Even with such disposition of the bearing-surface, any friction generated by the flange upon the collar at the outer and inner sides of such line may not be equal, and no calculation can determine exactly how such bearing-surface should be proportioned, at opposite sides of such line, to maintain in the collar a speed identical with that of the roll. All these difficulties are avoided by journaling the collars upon the rolls; they are left free to turn at any speed which may be determined by the resultant of all the forces which act upon them, and any tendency to twist or push the rolls from their normal path upon the hub is wholly avoided.

The invention is illustrated in the annexed drawing, in which—

Figure 1 is a longitudinal section, where hatched, at the center of Fig. 2, with the addition of the guide-cage for the rolls, which cage is not shown in Fig. 2. Fig. 2 is a view of the bearings taken from the left side of Fig. 1. Figs. 3 to 7 are upon a larger scale than the other figures. Fig. 3 is a section of one side of the hub with the roll thereon; Fig. 4 is a longitudinal section of the collar; and Fig. 5 a side elevation of the roll to fit the same. Figs. 6 and 7 show alternative constructions with an anti-friction washer between the collar and the roll in Fig. 6 and balls between the collar and the roll in Fig. 7. The upper part of the collar and adjacent surface of the roll is in section in Figs. 6 and 7.

$a$ designates the hub provided with conical seat $b$ having an annular groove $c$ at its larger end with a thrust-flange $d$ adjacent thereto.

$a'$ designates the casing, and $b'$ the seat fitted to the outer sides of the rolls. The end of the hub opposite the flange $d$ is provided with a groove $e$ to receive a flange $f$ upon a cage $g$ which may be constructed and fitted to the rolls in any suitable manner. Each roll is shown with tapering body $h$ having a journal $i$ projected from its larger end and a collar $j$ fitted movably thereto.

The parts are so proportioned that when the body $h$ is in its working position upon the hub-seat $b$ the outer end of the collar is in contact with the flange $d$, and is preferably beveled to fully contact with the flange. The contacting portion of the roll is so proportioned that the middle of its bearing-surface $k'$ is intersected by a line $k$ extended from the conical seat $b$, by which construction the bearing-surface of the collar projects about equally inside and outside of such line, where in contact with the flange $d$. The flange $d$ is preferably flat, which necessitates a bevel upon the outer corner of the hub at an obtuse angle to the bearing-surface of the roll. The bearing-surface upon the flange $d$ necessarily has a greater periphery outside of the line $k$ than it has inside of such line $k$, owing to its greater distance from the center of the hub. Upon the contrary, the bearing-surface upon the collar $j$ has its lesser periphery in contact with the surface of the flange outside of the line, and its greater periphery inside of such line, so that the flange tends to rotate the collar at two different velocities. The resultant of these determines the speed of the collar, which being loose upon the journal is free to turn at any velocity that may be induced by the flange $d$, whether or not its rotations correspond with those of the roll-body $h$, and any strain to twist the roll-body upon its seat is therefore avoided.

The pressure of the hub and casing upon the roll tends to force them endwise toward the collar $d$, and to diminish as much as possible the friction due to this thrust anti-friction devices of any suitable character may be inserted between the collar and the shoulder $h'$, shown upon the larger end of the roll in Fig. 5. An anti-friction washer $l$ is shown thus inserted in Fig. 6; and in Fig. 7 is shown a series of balls $l'$ inserted in ball-races $n$ in the opposed faces of the collar and shoulder $h'$. Such anti-friction devices permit the collar to turn upon the roll with the least possible friction, and thus permit independent movement of the collar and the roll, which is the chief feature of the invention. Any suitable means interposed between the auxiliary collar and the body-portion for reducing the friction may be employed, and the outer side of such auxiliary collar may be shaped in any suitable manner to resist end thrust by its pressure upon the thrust-resisting flange, as the essential feature of the invention is the fitting of the auxiliary collar to turn independently upon the end of the roll-body.

Having thus set forth the nature of the invention what is claimed herein is:

1. In a roller bearing containing tapering rolls, the combination, with a hub having a conical seat with an annular groove near the larger end and a flat annular flange next such groove projected outward beyond the line of the conical seat, of a series of rolls having each a tapering body fitted to the conical seat and a journal projected from its larger end toward the flat annular flange with a collar larger than the roll fitted to turn upon each of the said journals and rotated in the said groove, and having its outer corner beveled to form a conical surface bearing upon the said flange partly inside and partly outside the line of the roll-seat.

2. In a roller bearing containing tapering rolls, the combination, with a hub having a conical seat with an annular groove near the larger end and a flat annular flange next such groove projected outward beyond the line of the conical seat, of a series of rolls having each a tapering body fitted to the conical seat and a journal projected from its larger end toward the flat annular flange with a collar larger than the roll fitted to turn upon each of the said journals and rotated in the said groove, and having its outer corner beveled and proportioned to contact with the said flange on a line with the prolongation of the said conical seat, and bearing upon the said flange partly inside and partly outside the line of said seat.

In testimony whereof I have hereunto set my hand in the presence of two subscribing witnesses.

CHARLES S. LOCKWOOD.

Witnessses:
  H. G. RANSOM,
  M. E. JAHN.